Dec. 10, 1963 A. V. WEASLER 3,113,441
GUARD TUBE FOR JOINTED DRIVE SHAFTS
Filed April 10, 1962
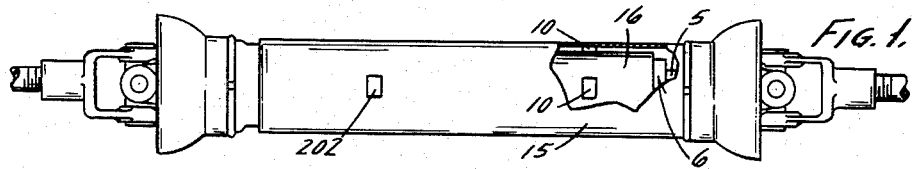
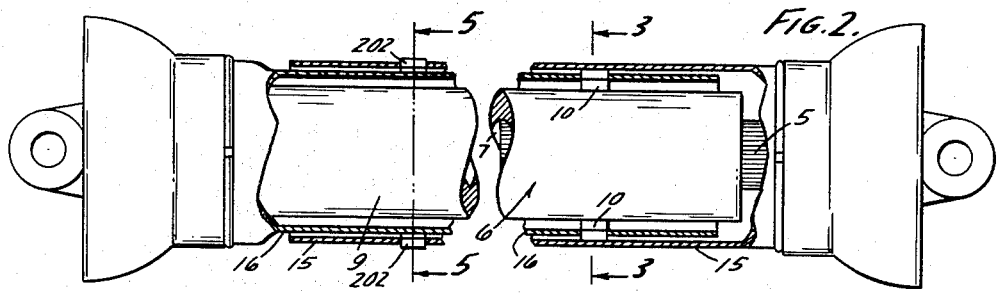
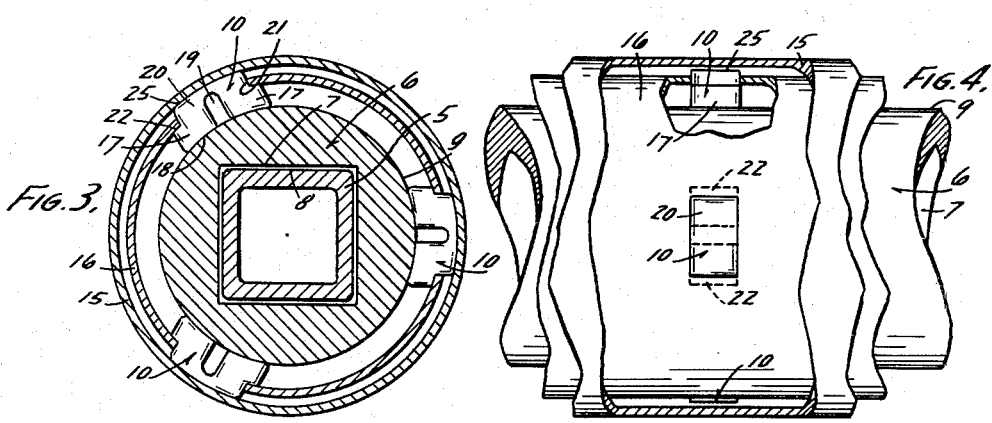
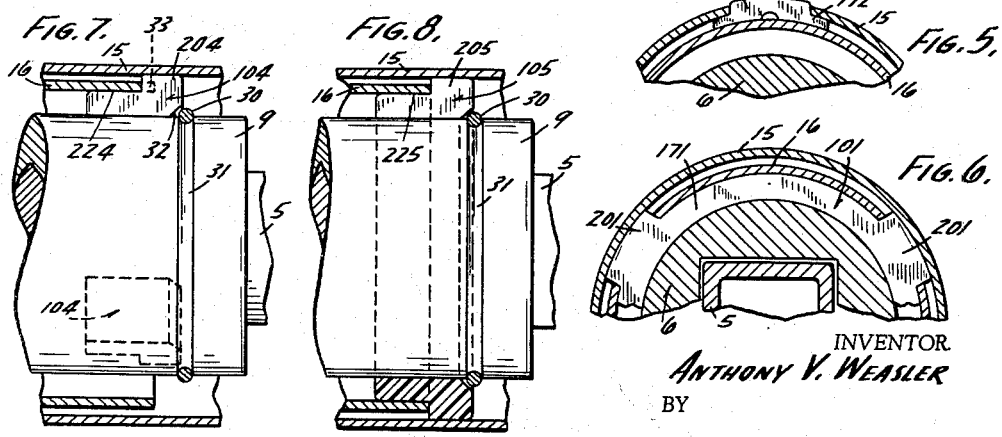
INVENTOR.
ANTHONY V. WEASLER
BY
Wheeler, Wheeler & Wheeler
ATTORNEYS.

United States Patent Office 3,113,441
Patented Dec. 10, 1963

3,113,441
GUARD TUBE FOR JOINTED DRIVE SHAFTS
Anthony V. Weasler, 603 Ridge Road, West Bend, Wis.
Filed Apr. 10, 1962, Ser. No. 186,497
7 Claims. (Cl. 64—3)

This invention relates to a guard tube for jointed drive shafts. It is of particular value in preventing chatter and rapid runout in high speed operation. The present application is a continuation in part of my application 103,830 filed April 18, 1961, now Patent No. 3,031,865.

The drive shaft and the guard tube both comprise telescopically extensible sections. As is conventional, the guard tube sections are freely rotatable upon respective shaft sections. Thus, while the guard tube sections tend to rotate with the shaft, they provide smooth external surfaces which do not tend to injure the person or clothing of an individual exposed to contact. Moreover, there is so little friction between the guard tube sections and those of the shaft that the guard tube will readily come to rest upon contact of an individual therewith, without impeding the rotation of the shaft or exposing the individual thereto.

One of the problems in a construction of this kind concerns the spacing of the guard tube sections from the shaft and from each other in a manner which will accommodate relative movement with minimum friction and at the same time will space the parts with such accuracy as to minimize wear and also eliminate radial "run out," and rattling or other noise.

The present invention is directed to this objective in a manner involving minimum expense by using shouldered bearing inserts. In a preferred arrangement these are set in openings in the inner of the two telescopically related guard tubes, such inserts having portions bearing on the outer periphery of the outer shaft section and also bearing on the inner periphery of the outer guard tube section. The inserts are desirably non-metallic and are preferably made of a synthetic resin which has very little friction, "nylon" being preferred from an expense standpoint and "Teflon" being another example.

However, in other embodiments the shouldered bearing inserts are so placed that the end of one of the tubes rests on the shoulder and the insert projects beyond said one tube to support the other tube in radially spaced relation thereto.

In the drawings:

FIG. 1 is a plan view of an assembly embodying the invention, portions of a guard tube wall being broken away to expose some of these.

FIG. 2 is an enlarged fragmentary view in elevation with portions of both guard tubes broken away.

FIG. 3 is a still further enlarged detail view taken in section on the line 3—3 of FIG. 2.

FIG. 4 is a view on the scale of FIG. 3 fragmentarily illustrating an elevation of the assembly with portions of the guard tubes broken away.

FIG. 5 is a fragmentary sectional detail view on line 5—5 of FIG. 2.

FIG. 6 is a fragmentary view on a reduced scale in section comparable to FIG. 3 and showing a modified embodiment.

FIG. 7 is an enlarged detail view comparable to FIG. 3 showing a modified embodiment of the invention.

FIG. 8 is a view similar to FIG. 7 showing a further modified embodiment of the invention.

The shaft as shown comprises universal joints which do not enter into the present invention. The inner shaft section 5 and the outer shaft section 6 are telescopically extensible and have bearing surfaces at 7 and 8 which are square or otherwise of non-circular cross section to constrain the two shaft sections to rotate together while permitting them freedom of axial extension and contraction. The outer surface 9 of the outer shaft section 6 is a cylindrical bearing surface engaged by the several bearing inserts 10. Desirably, these are spaced equidistantly peripherally of the shaft section 6 and in practice one or more sets of three are used. Only one set is shown. If there are more sets, the inserts of one set will be spaced axially from the inserts of the other.

The guard tube comprises outer and inner telescopically associated sleeves 15 and 16 which, according to the present invention, have no direct contact with each other, being spaced by boss portions 20 of the inserts 10 as now described.

Each of the inserts 10 has an inner bearing block portion 17 with a cylindrical face 18 bearing on the bearing surface 9 of the outer shaft section 6. The block may, if desired, be provided with a cavity extending into boss 20 at 19 but this is optional.

A boss 20, which is a radial extension of the block 17, passes through an opening 21 in the inner guard tube 16. This extension has less peripheral extent than the block 17, thereby providing shoulders at 22 which seat against the inner periphery of the guard tube 16 at the margins thereof adjacent the opening 21. The height of the boss or extension 20 is sufficient so that its outer cylindrical bearing surface 25 will engage the inner periphery of the outer guard tube 15 to support this guard tube free of contact with the inner guard tube 16, thus precluding "run out," rattling and wear between the parts of the guard tube.

The block 17 may have any desired peripheral extent as suggested by the block 171 fragmentarily illustrated in FIG. 6 and may therefore provide continuous bearing support for guard section 16 between any desired number of bosses 201, two being illustrated. However, these must be distributed circumferentially to center the various tubes. The flexibility of the material permits the insert to be assembled into guard tube element 16 even if the block 171 has full 360° extent in split or solid form. It is immaterial whether or not the insert rotates, since it will perform its centering function in either case.

In assembling the parts, it is only necessary to set the boss portions 17 of inserts 10 in the openings 21 of the inner guard tube. The fit is sufficiently close so that the inserts tend to remain in this position as the inner guard tube element 16 and inserts are sleeved over the bearing surface 9 of the outer periphery of the outer shaft section 6. The association of the inner guard tube section 16 and outer shaft section 6 positively fixes the several inserts 10 against displacement or loss. The block portion 17 spaces the inner guard tube section 16 from the outer shaft section 6 with precision and each boss or extension provides for similarly precise spacing of the outer guard tube section 15 from the inner section 16 of the guard tube. The engagement of the block 17 or 171 with the inner periphery of guard tube section 16 positively defines the location of outer guard tube section 15, since the projections or bosses 20 or 201 extend to a uniform distance beyond such shoulders.

The construction shown in FIG. 7 is similar to that already described except that the insert 104 extends around the end of the intermediate tube 16 in order that its boss portion 204 may engage the outer tube 15 while its shoulder 224 is within the intermediate tube 16 to support it and the inner tubular member 9. Since the boss 204 is not disposed within an aperture, means must be provided to position it. To keep it from escaping axially a snap ring 30 may be engaged in a groove 31 formed in member 9, the insert 104 preferably being beveled at 32 to engage the ring. However, the bevel is not essential.

To hold the inserts against angular displacement, the end of the intermediate member 16 may be notched as indicated in dotted lines at 33 in FIG. 7.

If the insert is a continuous annulus as shown at 105 in FIG. 8, the notching of the intermediate member 16 is not required, the end thereof being supported on the shoulder 225 and the outer sleeve shaft 15 being supported on the boss 205.

It will be noted that the prefabricated plastic spacer provides simple and inexpensive means for nearly frictionless spacing of the tubular members from each other. The intermediate member may either be apertured with the boss portions projecting through the apertures thereof, or the boss may project past the end of the intermediate member.

It is broadly immaterial whether the bosses project inwardly or outwardly from the intermediate member with which the shoulders are engaged.

Similar spacers may be used merely to space the guard tube sections from each other, particularly at the free end of the outer tube 15, as shown in FIGS. 2 and 6. In such usage the block portion 172 of the insert intervenes between guard tube sections 15 and 16, the blocks 204 projecting through the outer section 15 and serving merely as positioners.

I claim:

1. The combination with an inner member having an external peripheral bearing surface and an outer member having an internal bearing surface and an intermediate member being required to be spaced from the inner and outer members, of a shouldered insert having inner and outer bearing surfaces complementary to and engaged with the said bearing surfaces of the inner and outer members, said insert having a shoulder abutting the intermediate member to position it with respect to the inner and outer members.

2. The combination set forth in claim 1 in which a plurality of such inserts are peripherally spaced about said members to maintain them centered with respect to each other.

3. The combination set forth in claim 1 in which said members are of circular cross section, the said insert comprising an annulus interposed between the intermediate member and one of the other members, said annulus having bosses projecting beyond the shoulder and engaged with the second of said other members.

4. The combination set forth in claim 1 in which said intermediate member has an end supported on the shoulder of said insert, the insert having a boss portion beyond said end and providing one of its said bearing surfaces.

5. The combination set forth in claim 1 in which the said insert shoulder is annular and disposed between the inner and intermediate members the said insert having a portion extending beyond the shoulder and engaged with the bearing surface of the outer member.

6. The combination with a shaft member having an outer bearing surface and an outer guard member interiorly having a bearing surface, of an intermediate guard member interposed between said bearing surfaces and spaced therefrom, and a bearing insert having a base portion engaged with one of said bearing surfaces and a boss portion engaged with the other, the said insert having a shoulder abutting the intermediate guard member and comprising means for limiting the projection of the boss portion of the insert therebeyond.

7. The combination set forth in claim 6 in which the bearing insert is disposed between the shaft member and intermediate guard member and the boss is engaged with the outer guard member.

References Cited in the file of this patent
UNITED STATES PATENTS

| | | |
|---|---|---|
| 2,772,550 | Harrington | Dec. 4, 1956 |
| 2,923,140 | Wessler | Feb. 2, 1960 |
| 3,031,865 | Wessler | May 1, 1962 |